United States Patent
Lambros (10) Patent No.: US 7,434,826 B1
(45) Date of Patent: Oct. 14, 2008

(54) SELF-LOCKING SCISSOR COUPLER FOR ATTACHING A TRAILER TO A TRAILER HITCH BALL

(76) Inventor: Mark L. Lambros, 115 Green Needles Dr., Lexington, NC (US) 27292

( * ) Notice: Subject to any disclaimer, the term of this patent is extended or adjusted under 35 U.S.C. 154(b) by 360 days.

(21) Appl. No.: 11/289,788

(22) Filed: Nov. 30, 2005

(51) Int. Cl.
  *B60D 1/04* (2006.01)

(52) U.S. Cl. .................. 280/508; 280/509; 280/510; 280/477

(58) Field of Classification Search .......... 280/508, 280/509, 510, 477
  See application file for complete search history.

(56) References Cited

U.S. PATENT DOCUMENTS

| | | | |
|---|---|---|---|
| 1,254,199 A | 1/1918 | Brice | 280/512 |
| 2,435,024 A | 1/1948 | Wagner | 280/512 |
| 2,459,448 A | 1/1949 | Murray | 280/512 |
| 4,502,706 A * | 3/1985 | Frambach, Sr. | 280/416.2 |
| 4,568,098 A | 2/1986 | Landry, Jr. | |
| 5,205,666 A | 4/1993 | Hollis | |
| 5,482,309 A | 1/1996 | Hollis | |
| 5,997,025 A * | 12/1999 | Wisecarver | 280/508 |
| 6,186,532 B1 * | 2/2001 | Ray et al. | 280/508 |
| 6,224,084 B1 | 5/2001 | Ray et al. | |
| 6,234,509 B1 | 5/2001 | Lara | |
| 6,485,046 B1 | 11/2002 | Hsueh et al. | |
| 6,908,093 B1 * | 6/2005 | Putnam | 280/435 |
| D526,252 S * | 8/2006 | Lambros | D12/162 |
| 2005/0039498 A1 | 2/2005 | Budge | |

* cited by examiner

*Primary Examiner*—Lesley D. Morris
*Assistant Examiner*—Marlon A Arce Diaz (57) ABSTRACT

A self-locking scissor coupler, provision for holding guide poles, for attaching a trailer to a trailer hitch ball. The coupler includes a body, a pair of movable jaws, and a bail. The body attaches to the trailer. The pair of movable jaws are pivotally mounted to the body and normally biased open. The bail is pivotally mounted to the body and normally biased down so as to allow the pair of movable jaws to be normally biased open when the bail is lifted up and disengaged from the pair of movable jaws, and when the pair of movable jaws are engaged by the trailer hitch ball, the pair of jaws close causing the bail to drop, engage the pair of movable jaws, and maintain the pair of jaws closed, thereby automatically capturing the trailer hitch ball in the pair of movable jaws.

29 Claims, 6 Drawing Sheets

SELF-LOCKING SCISSOR COUPLER FOR ATTACHING A TRAILER TO A TRAILER HITCH BALL

BACKGROUND OF THE INVENTION

1. Field of the Invention

The present invention relates to a scissor coupler for attaching a trailer to a trailer hitch ball, and more particularly, the present invention relates to a self-locking scissor coupler for attaching a trailer to a trailer hitch ball.

2. Description of the Prior Art

Numerous innovations for trailer couplers have been provided in the prior art that will be described. Even though these innovations may be suitable for the specific individual purposes to which they address, however, they differ from the present invention.

A FIRST EXAMPLE, U.S. Pat. No. 4,568,098, Issued on Feb. 4, 1986, to Landry, Jr. teaches a trailer hitch adapted for attachment to a lunette coupler or a ball coupler comprises a pintle hook and a ball mounted on the hook and adapted to receive a ball coupler, and a closure pivotally mounted on the hook and pivotable between a closed position in engagement with the ball and an open position spaced from the ball. The aperture defined by the closure and the hook includes a lower circular open portion, the center point of the lower circular portion lying on a first horizontal plane substantially bisecting the pattern of attachment of the hitch, the first horizontal plane lying below a second horizontal plane projected tangent to the under surface of the ball, the rearmost point within the aperture defined by the pintle hook and the closure in closed position to receive and hold the lunette, lying the further rearward from the vertical plane of the attachment plate, lies within the lower circular portion of the aperture in a horizontal plane passing through the center of the attachment pattern, whereby during towing, the load of the trailer attached by the lunette is evenly distributed over the pattern of attachment. In one further aspect, the hitch includes a second configuration, e.g. a second ball, which may be selectively positioned for towing attachment.

A SECOND EXAMPLE, U.S. Pat. No. 5,205,666, Issued on Apr. 27, 1993, to Hollis teaches an improved trailer coupler is provided for a trailer having a forwardly extending tongue, which consists of a housing fixed on and extending forwardly from the tongue. A pair of opposed jaws are pivoted on vertical axes on the housing. Each jaw has an inner side formed with a spherical concavity for embracing a hitch ball and a surface for forcing said improved trailer coupler to align with a said hitch ball. A jaw locking bail has a bight portion with a finger tab to facilitate operation of the bail and a pair of side portions, each with an ear extension. The side portions are horizontally pivoted on the housing at the ear extension at opposite sides of the housing. The ball is swingable forwardly and downwardly from an elevated retracted position to a horizontal jaw-locking position, wherein the side portions completely engage the outer sides of the jaws and the bight portion completely engages the forward ends of the jaws in the closed positions of the jaws. A closure compression spring is located inwardly at one horizontally pivoted ear extension for biasing the bail towards the jaw-locking position.

A THIRD EXAMPLE, U.S. Pat. No. 5,482,309, Issued on Jan. 9, 1996, to Hollis teaches a scissor coupler, for attaching to a trailer hitch ball having a widest point and a neck, comprising a top plate, a bottom plate, a hinge bolt, and a main spring connected between the top plate and bottom plate. The hinge bolt attaches the top plate and bottom plate so that they can pivot relative to one another from a closed position to an open position. The top plate and bottom plate have top plate and bottom plate bores that have a slightly larger diameter than the widest point of the trailer hitch ball, and are concentric when the top plate and bottom plate are in the open position. The top plate and bottom plate bores are not concentric when the scissor coupler is in the closed position. When the top plate and bottom plate are in the closed position, an elliptical hole is formed therebetween that is narrower than the widest point but wider than the neck of the trailer hitch ball. The main spring biases the scissor coupler to the closed position.

A FOURTH EXAMPLE, U.S. Pat. No. 5,997,025, Issued on Dec. 7, 1999, to Wisecarver teaches a trailer hitch including a pair of clamping jaws and a retractable jaw locking member in the form of a wedge block that is spring biased to move between the jaws in order to lock the jaws in a closed position about a hitch ball. A latch mechanism secures the wedge block in its retracted position away from the jaws. A plunger dog is pivoted by a handle mechanism to reposition wedge block and a safety pin mechanism is provided to secure the plunger dog in position and thereby secure wedge block in position.

A FIFTH EXAMPLE, U.S. Pat. No. 6,224,084 B1, Issued on May 1, 2001, to Ray et al. teaches a trailer coupler is described in which a pair of elongated hitch capturing members, each having a hitch socket part at a forward end are mounted to a base member for selective movement forward and rearwardly between a forwardly extended and open hitch receiving position wherein the hitch socket parts are separated and a rearwardly retracted and closed hitch capturing position wherein the hitch socket parts are closed together. A hitch positioner member is movably mounted to the base member and including a hitch abutment surface positioned between the hitch capturing members in the forwardly extended and open hitch receiving position. The hitch positioner member is connected to at least one of the hitch capturing members to move the hitch capturing member rearwardly in response to engagement by a rearwardly moving hitch. Interacting cam surfaces on at least one of the hitch capturing members and base member are responsive to rearward motion of the hitch capturing members to move the hitch capturing members to the closed hitch capturing position responsive to rearward movement of the hitch capturing members.

A SIXTH EXAMPLE, U.S. Pat. No. 6,234,509 B1, Issued on May 22, 2001, to Lara teaches a device and method for coupling a trailer which has a trailer tongue mount attached to the trailer and a coupler attached to the trailer tongue mount. The coupler has an outer tube assembly, an inner tube assembly slidably received by the outer tube assembly, and a return spring having a first end attached to the outer tube assembly, and a second end attached to the inner tube assembly for drawing the inner tube assembly upwardly toward the first end of the return spring. The inner tube assembly may include an inner tubular member which has a plurality of height adjusting holes, a top end and a bottom end. The inner tube assembly may also include a female coupling member attached to the bottom end of the tubular member. A locking handle assembly may be attached to the inner tube assembly to prevent the coupler from disengaging from the towing vehicle. The outer tube assembly may include an outer tubular member, a reinforcing band attached to the outer tubular member, an adjusting nut attached to the reinforcing band, and an adjusting bolt in communication with the nut to provide a friction force on the inner tube assembly. A plunger pin may engage one of the adjusting holes in the inner tube assembly. A snapper pin may be used to indicate that the plunger pin is properly closed.

A SEVENTH EXAMPLE, U.S. Pat. No. 6,485,046 B1, Issued on Nov. 26, 2002, to Hsueh et al. teaches a trailer hitch assembly for connecting a towing vehicle to a towed trailer having symmetrical anti-sway features. The assembly includes a hitch ball rigidly affixed to a hitch beam extending transversely from the rear of the towing vehicle. A pair of spring-biased telescopic compressible and extendable control rods are connected to each end of the hitch beam and at their other end to a control beam. A hitch bar is connected to the hitch ball on the towing vehicle and pivotally connected to the forward end of a trailer coupler that intersects and is pivotally connected to the central portion of the control beam by a pivot member. The pivot member is integral with the control beam and includes a control arm having a roller engaged with a downwardly opening slotted rearward end of the hitch bar. The trailer coupler includes a trailer hitch ball to which a trailer coupler socket is connected, with the trailer coupler socket being rigidly affixed to the tongue or frame of the towed vehicle.

AN EIGHTH EXAMPLE, U.S. patent Office Document No. 2005/0039498 A1, Published on Feb. 24, 2005, to Budge teaches a trailer coupler locking device having a shackle which has a top joined to two substantially straight legs with a curved section that is preferably a generally convex curve. The base contains a cylinder lock symmetrically located between two apertures for accommodating the substantially straight legs of the shackle. A plug member is located on top of the base; preferably the plug member is a stepped ball. Associated with the cylinder lock are two bolts, one of which has an end that enters the first aperture for the straight legs and another of which has an end that enters the second aperture for the straight legs. A blocking member works with the cylinder lock to control the movement of the straight legs and preferably has three positions for doing so which are associated with the positions of the preferred cylinder lock, which is a three-position lock.

It is apparent that numerous innovations for trailer couplers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, it is an object of the present invention to provide a self-locking scissor coupler for attaching a trailer to a trailer hitch ball that avoids the disadvantages of the prior art.

Briefly stated, another object of the present invention is to provide a self-locking scissor coupler for attaching a trailer to a trailer hitch ball. The coupler includes a body, a pair of movable jaws, and a bail. The body attaches to the trailer. The pair of movable jaws are pivotally mounted to the body and normally biased open. The bail is pivotally mounted to the body and normally biased down so as to allow the pair of movable jaws to be normally biased open when the bail is lifted up and disengaged from the pair of movable jaws, and when the pair of movable jaws are engaged by the trailer hitch ball, the pair of jaws close causing the bail to drop, engage the pair of movable jaws, and maintain the pair of jaws closed, thereby self-lockingly capturing the trailer hitch ball in the pair of movable jaws.

A still further objective of the present invention is to produce a trailer coupler that will eliminate or improve the shortcomings of prior art trailer couplers. Major areas of improvement are:
1. An alignment system that provides significantly improved visual alignment when positioning the ball in the grasp of the coupler jaws.
2. A significantly improved triplet safety lock system that ensures the coupler remains locked in all conditions.
3. A significantly enlarged area provided for ball positioning to drastically improve trailer hooking efficiency.

Accordingly, the coupler uses a totally new design for the locking jaws that encompass jaw extensions and provides significantly more space for positioning the incoming hitch ball.

The coupler uses this new jaw design to provide a secure method to hold the jaws open, eliminate premature closure of the jaws and to keep the jaws from pivoting outside the ball capture range. This jaw design also encapsulates most of the ball, once in the locked position, and prevents "ball rattle" which is a problem with many prior art trailer coupler designs.

The jaws are also designed to provide a "rest" for the locking bail when the jaws are open prior to locking.

The coupler uses a spring loaded pull pin system that provides an automatic feature that locks the coupler fully open or closed. This pin is a permanent part of the coupler and is not removable.

The coupler also utilizes a special full length manual locking pin that positions the locking bail in a secure closed position for safer operation than prior art couplers. The locking pin is mounted on the coupler securely with a coated lanyard to prevent loss and provide quick access to this locking feature.

The coupler jaws, locking bail and locking pin have been designed to prevent catastrophic failure of the coupler in the event that any of the individual parts fail during towing.

Another unique feature of this coupler is the special alignment and coupler indicator system, where the guide poles are mounted on jaw extensions to provide accurate sighting for backing the vehicle into the receiving area of the coupler. The guide poles move from the extended position to the closed position (approximately 5 inches) indicating that the coupler jaws have secured the ball and the locking bail has secured the jaws in the towing position.

Another significant feature of this type locking design is that once the coupler is closed, it clearly indicates that the trailer and tow vehicle are securely locked together, which unlike most prior art trailer couplers that appear to be coupled to the ball, but are in fact actually resting on top of the ball, and not coupled at all.

Specialty springs are being used to provide tension and locking capability for the locking bail and to open the jaws when the locking bail has been released.

One other unique feature of this coupler is that it has been designed with flexibility to be mounted directly on most standard trailer frames including those with breakaway pivoting tongues.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

LIST OF REFERENCE NUMERALS UTILIZED IN THE DRAWING 20 self-locking scissor coupler of present invention for attaching trailer 21 to trailer hitch ball 22
21 trailer
22 trailer hitch ball
24 body for attaching to trailer 21

-continued 26 pair of movable jaws
28 bail
30 inverted channel of body 24
32 forward end of inverted channel 30 of body 24
34 back end of inverted channel 30 of body 24
36 pair of sides of inverted channel 30 of body 24
37 top of inverted channel 30 of body 24
38 open bottom of inverted channel 30 of body 24 for capturing of trailer 21 in body 24
40 jaw-mounting platform of body 24
41 sides of jaw-mounting platform 40 of body 24
42 pair of jaw-mounting through bores in jaw-mounting platform 40 of body 24
43 rear portion of each side of pair of sides 36 of body 24
44 pair of trailer-mounting through bores in each side of pair of sides 36 of body 24
46 front portion of one side of pair of sides 36 of body 24
48 primary lock-mounting through bore in one side of pair of sides 36 of body 24
50 intermediate portion of each side of pair of sides 36 of body 24
52 pivot pin-mounting through bore in each side of pair of sides 36 of body 24
54 secondary lock-mounting through bore in each side of pair of sides 36 of body 24
56 trailer-mounting bolts of body 24
58 pair of trailer-mounting through bores in trailer 21
60 pair of washers of body 24
62 pair of nuts of body 24
64 forward end of each jaw of pair of movable jaws 26
65 inner side of each jaw of pair of movable jaws 26
66 back end of each jaw of pair of movable jaws 26
68 guide-mounting platform of each jaw of pair of movable jaws 26
70 guide mounting bore 70 in guide-mounting platform 68 of each jaw of pair of movable jaws 26
72 guide pole of each jaw of pair of movable jaws 26
74 stud of each jaw of pair of movable jaws 26
76 jaw-mounting through bore in each jaw of pair of movable jaws 26
78 jaw-mounting plate of pair of movable jaws 26
79 sides of jaw-mounting plate of pair of movable jaws 26
80 pair of jaw-mounting through bores in jaw-mounting plate 78 of pair of movable jaws 26
82 pair of jaw-mounting pivot pins of pair of movable jaws 26
84 pair of clips of pair of movable jaws 26
86 biasing spring of pair of movable jaws 26
88 pair of ends of biasing spring 86 of pair of movable jaws 26
90 forward end of bail 28
92 top edge of bail 28
94 bottom edge of bail 28
95 pair of sides of bail 28
96 pair of free ends of bail 28
98 recess in bottom edge 94 of bail 28
100 tongue of top edge 92 of bail 28
102 pivot pin-mounting through bore in each free end of pair of free ends 96 of bail 28
104 secondary lock-mounting through bore in each free end of pair of free ends 96 of bail 28
106 primary lock-mounting through bore in one side of pair of sides 95 of bail 28
108 pivot pin assembly
110 pivot pin of pivot pin assembly 108
111 pair of ends of pivot pin 110 of pivot pin assembly 108
112 biasing spring of pivot pin assembly 108
113 pair of ends of biasing spring 112 of pivot pin assembly 108
114 stud of pivot pin 110 of pivot pin assembly 108
116 primary lock assembly
118 secondary lock assembly
120 pin of secondary lock assembly 116
121 pair of ends of pin 120 of secondary lock assembly 116
122 lanyard of secondary lock assembly 116
124 pair of ends of lanyard 122 of secondary locking assembly 118
126 bushing of primary lock assembly 116
128 pull ring of primary lock assembly 116
129 stem of pull ring 128 of primary lock assembly 116
130 spring of primary lock assembly 116
131 free end of stem 129 of pull ring 128 of primary lock assembly 116
132 plunger of primary lock assembly 116

DETAILED DESCRIPTION OF THE PREFERRED EMBODIMENT

Figure 1:
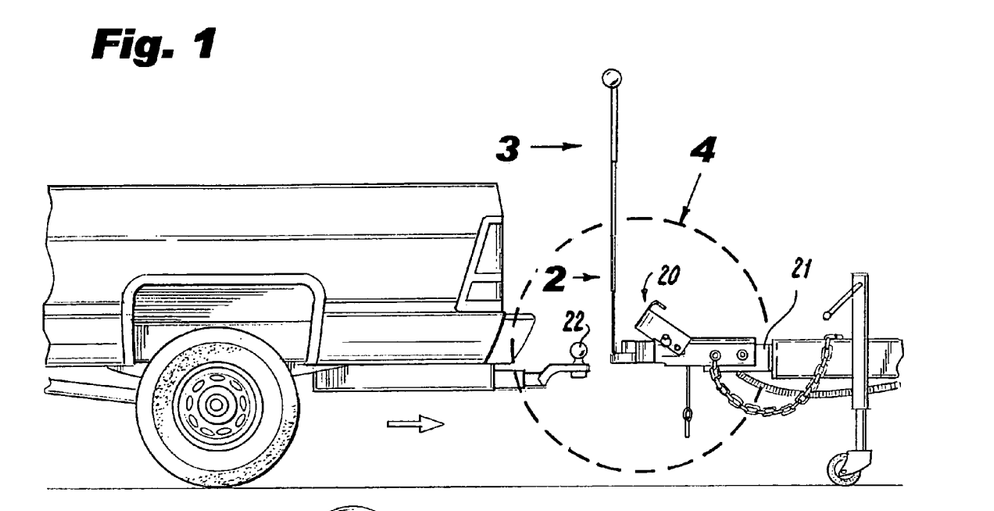
FIG. 1 is a diagrammatic side elevational view of the self-locking scissor coupler of the present invention attached to a trailer and in the process of attaching to a trailer hitch ball.
Figure 2:
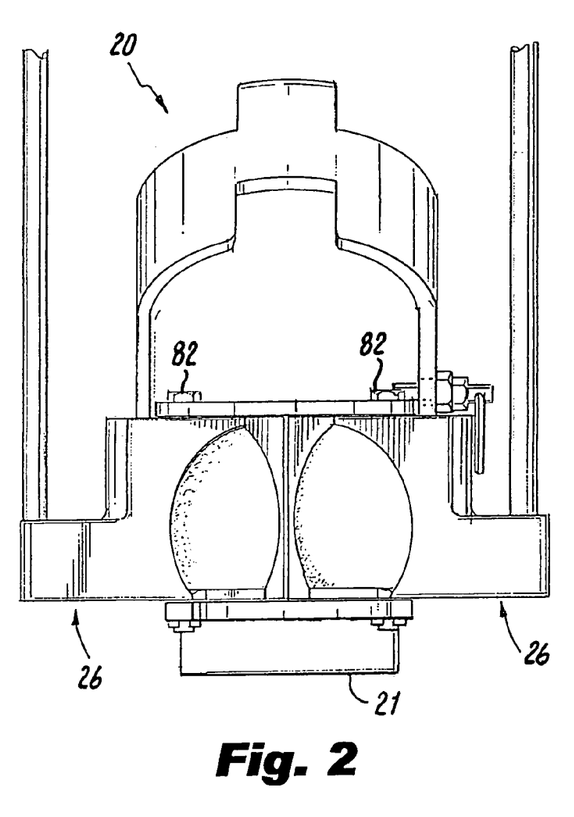
FIG. 2 is an enlarged diagrammatic front elevational view taken generally in the direction of ARROW 2 in FIG. 1.
Figure 3:
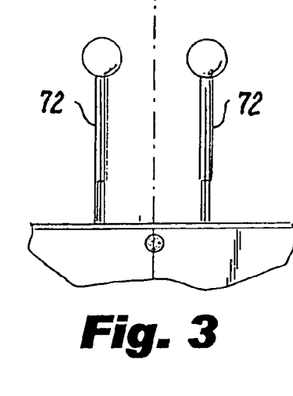
FIG. 3 is an enlarged diagrammatic front elevational view taken generally in the direction of ARROW 3 in FIG. 1.

Referring now to the figures, in which like numerals indicate like parts, and particularly to FIGS. 1-3, which are, respectively, a diagrammatic side elevational view of the self-locking scissor coupler of the present invention attached to a trailer and in the process of attaching to a trailer hitch ball, an enlarged diagrammatic front elevational view taken generally in the direction of ARROW 2 in FIG. 1, and, an enlarged diagrammatic front elevational view taken generally in the direction of ARROW 3 in FIG. 1, the self-locking scissor coupler of the present invention is shown generally at 20 for attaching a trailer 21 to a trailer hitch ball 22.

The overall configuration of the self-locking scissor coupler 10 can best be seen in FIG. 4, which is an enlarged diagrammatic perspective view of the area generally enclosed by the dotted curve identified by ARROW 4 in FIG. 1, and as such, will be discussed with reference thereto.

The self-locking scissor coupler 10 comprises a body 24, a pair of movable jaws 26, and a bail 28. The body 24 is for attaching to the trailer 21. The pair of movable jaws 26 are pivotally mounted to the body 24 and normally biased open. The bail 28 is pivotally mounted to the body 24 and normally biased down so as to allow the pair of movable jaws 26 to be normally biased open when the bail 28 is lifted up and disengaged from the pair of movable jaws 26, and when the pair of movable jaws 26 are engaged by the trailer hitch ball 22, the pair of jaws 26 close causing the bail 28 to drop, engage the pair of movable jaws 26, and maintain the pair of jaws 26 closed, thereby self-lockingly capturing the trailer hitch ball 22 in the pair of movable jaws 26.

The specific configuration of the self-locking scissor coupler 10 can best be seen in FIG. 5, which is an exploded diagrammatic perspective view of the self-locking scissor coupler of the present invention shown in FIGS. 1-4, and as such, will be discussed with reference thereto.

The body 24 is an inverted channel 30 with a forward end 32, a back end 34, a pair of sides 36, a top 37, and an open bottom 38. The open bottom 38 of the body 24 allows for capturing of the trailer 21 in the body 24.

The top 37 of the body 24, at the forward end 32 of the body 24, extends past the pair of sides 36 of the body 24 to form a jaw-mounting platform 40.

The jaw-mounting platform 40 of the body 24, at sides 41 thereof, has a pair of jaw-mounting through bores 42. The pair of jaw-mounting through bores 42 in the jaw-mounting platform 40 of the body 24 are laterally spaced-apart from each other and extend vertically therethrough.

Each side of the pair of sides 36 of the body 24, at a rear portion 43 thereof, has a pair of trailer-mounting through bores 44. The pair of trailer-mounting through bores 44 in each side of the pair of sides 36 of the body 24 are axially spaced-apart from each other, extend horizontally therethrough, and align with the trailer-mounting through bores 44 in the other side of the pair of sides 36 of the body 24.

One side of the pair of sides 36 of the body 24, at a front portion 46 thereof, has a primary lock-mounting through bore 48. The primary lock-mounting through bore 48 in the one side of the pair of sides 36 of the body 24 extends horizontally therethrough.

Each side of the pair of sides 36 of the body 24, at an intermediate portion 50 thereof, has a pivot pin-mounting through bore 52. The pivot pin-mounting through bore 52 in each side of the pair of sides 36 of the body 24 extends horizontally therethrough and aligns with the pivot pin-mounting through bore 52 in the other side of the pair of sides 36 of the body 24.

Each side of the pair of sides 36 of the body 24, at the front portion 46 thereof, has a secondary lock-mounting through bore 54. The secondary lock-mounting through bore 54 in each side of the pair of sides 36 of the body 24 extends horizontally therethrough, is below the pivot pin-mounting through bore 52 in each side of the pair of sides 36 of the body 24, and aligns with the secondary lock-mounting through bore 54 in the other side of the pair of sides 36 of the body 24.

The body 24 further has a pair of trailer-mounting bolts 56. The pair of trailer-mounting bolts 56 of the body 24 enter the pair of trailer-mounting through bores 44 in one side of the pair of sides 36 of the body 24, enter a pair of trailer-mounting through bores 58 in the trailer 21, pass out the pair of trailer-mounting through bores 44 in the other side of the pair of sides 36 of the body 24, and engage a pair of washers 60, respectively, and a pair of nuts 62, respectively.

Each jaw of the pair of movable jaws 26 has a forward end 64, an inner side 65, and a back end 66. The forward end 64 of each jaw of the pair of movable jaws 26 extends forwardly to form a guide-mounting platform 68.

The guide-mounting platform 68 of each jaw of the pair of movable jaws 26 has a guide-mounting bore 70. The guide mounting bore 70 in the guide-mounting platform 68 of each jaw of the pair of movable jaws 26 extends vertically therethrough and receives an optionally telescopic guide pole 72.

The back end 66 of each jaw of the pair of movable jaws 26 has a stud 74. The stud 74 of the back end 66 of each jaw of the pair of movable jaws 26 extends rearwardly therefrom.

Each jaw of the pair of movable jaws 26 has a jaw-mounting through bore 76. The jaw-mounting through bore 76 in each jaw of the pair of movable jaws 26 extends vertically therethrough.

The pair of movable jaws 26 further has a jaw-mounting plate 78.

The jaw-mounting plate 78 of the pair of movable jaws 26, at sides 79 thereof, has a pair of jaw-mounting through bores 80. The pair of jaw-mounting through bores 80 in the jaw-mounting plate 78 of the pair of movable jaws 26 extend vertically therethrough and align with the jaw-mounting through bore 76 in each jaw of the pair of movable jaws 26, respectively, and the pair of jaw-mounting through bores 42 in the jaw-mounting platform 40 of the body 24, respectively.

The pair of movable jaws 26 further has a pair of jaw-mounting pivot pins 82. The pair of jaw-mounting pivot pins 82 of the pair of movable jaws 26 enter the pair of jaw-mounting through bores 42 in the jaw-mounting platform 40 of the body 24, respectively, enter the jaw-mounting through bore 76 in each jaw of the pair of movable jaws 26, respectively, enter and pass out the pair of jaw-mounting through bores 80 in the jaw-mounting plate 78 of the pair of movable jaws 26, respectively, and engage a pair of clips 84, respectively.

The pair of movable jaws 26 further has a biasing spring 86 with a pair of ends 88. Each end of the pair of ends 88 of the biasing spring 86 of the pair of movable jaws 26 engage the stud 74 of the back end 66 of a respective jaw of the pair of movable jaws 26, and in so doing, biases the pair of movable jaws 26 open.

The inner side 65 of each jaw of the pair of movable jaws 26 is relieved so as to provide room for the pair of movable jaws 26 to open under biasing of the biasing spring 86 of the pair of movable jaws 26.

The bail 28 is U-shaped and has a forward end 90, a top edge 92, a bottom edge 94, a pair of sides 95, and a pair of free ends 96.

The bottom edge 94 of the bail 28, at the forward end 90 thereof, has a recess 98. The recess 98 in the bottom edge 94 of the bail 28 extends vertically therein.

The top edge 92 of the bail 28, at the forward end 90 thereof, has a tongue 100. The tongue 100 of the top edge 92 of the bail 28 extends upwardly and then rearwardly therefrom.

Each free end of the pair of free ends 96 of the bail 28 has a pivot pin-mounting through bore 102. The pivot pin-mounting through bore 102 in each free end of the pair of free ends 96 of the bail 28 extends horizontally therethrough and aligns with the pivot pin-mounting through bore 102 in the other free end of the pair of free ends 96 of the bail 28 and the pivot pin-mounting through bore 52 in each side of the pair of sides 36 of the body 24.

Each free end of the pair of free ends 96 of the bail 28 further has secondary lock-mounting through bore 104. The secondary lock-mounting through bore 104 in each free end of the pair of free ends 96 of the bail 28 extends horizontally therethrough, is below the pivot pin-mounting through bore 102 in each free end of the pair of free ends 96 of the bail 28, and aligns with the secondary lock-mounting through bore 104 in the other free end of the pair of free ends 96 of the bail 28 and the secondary lock-mounting through bore 54 in each side of the pair of sides 36 of the body 24.

One side of the pair of sides 95 of the bail 28 has a primary lock-mounting through bore 106. The primary lock-mounting through bore 106 in the one side of the pair of sides 95 of the bail 28 extends horizontally therethrough and aligns with the primary lock-mounting through bore 48 in the one side of the pair of sides 36 of the body 24.

The self-locking scissor coupler 10 further comprises a pivot pin assembly 108. The pivot pin assembly 108 comprises a pivot pin 110 with a pair of ends 111, and a biasing spring 112 with a pair of ends 113. The biasing spring 112 of the pivot pin assembly 108 receives the pivot pin 110 of the pivot pin assembly 108.

The pivot pin assembly 108 is nestled in the body 24, with the pair of ends 111 of the pivot pin 110 of the pivot pin assembly 108 extending in the pivot pin-mounting through bore 52 in each side of the pair of sides 36 of the body 24, respectively, and the pivot pin-mounting through bore 102 in each free end of the pair of free ends 96 of the bail 28, respectively, with one end 113 of the biasing spring 112 of the biasing assembly 108 engaging a stud 114 in one end 111 of the pivot pin 110 of the pivot pin assembly 108 (FIG. 6, which is an enlarged diagrammatic perspective view of the area generally enclosed by the dotted curve identified by ARROW 6 in FIG. 5 of the spring assembly of the self-locking scissor coupler of the present invention), and with the other end 113 of the biasing spring 112 of the biasing assembly 108 stopping against the top 37 of the body 24 so as to bias the bail 28 downwardly.

The self-locking scissor coupler 10 further comprises a primary lock assembly 116. The primary lock assembly 116 is affixed in the primary lock-mounting through bore 106 in the one side of the pair of sides 95 of the bail 28 and selectively engages in the primary lock-mounting through bore 48 in the one side of the pair of sides 36 of the body 24, and when the primary lock assembly 116 is engaged in the primary lock-mounting through bore 48 in the one side of the pair of sides 36 of the body 24 the bail 28 is prevented from being lifted, thereby locking the pair of movable jaws 26 closed.

The self-locking scissor coupler 10 further comprises a secondary lock assembly 118. The secondary lock assembly 118 comprises a pin 120 with a pair of ends 121, and a lanyard 122 with a pair of ends 124. One end of the pair of ends 124 of the lanyard 122 of the secondary locking assembly 118 is affixed to one side of the pair of sides 36 of the body 24 and the other end of the pair of ends 124 of the lanyard 122 of the secondary lock assembly 118 is affixed to one end of the pair of ends 121 of the pin 120 of the secondary lock assembly 118, with the pin 120 of the secondary lock assembly 118 selectively entering the secondary lock-mounting through bore 104 in one free end of the pair of free ends 96 of the bail 28, the secondary lock-mounting through bore 54 in each side of the pair of sides 36 of the body 24, and trough and out the secondary lock-mounting through bore 104 in the other free end of the pair of free ends 96 of the bail 28, and when the pin 120 of the secondary lock assembly 118 enters the secondary lock-mounting through bore 104 in the one free end of the pair of free ends 96 of the bail 28, the secondary lock-mounting through bore 54 in each side of the pair of sides 36 of the body 24, and through and out the secondary lock-mounting through bore 104 in the other free end of the pair of free ends 96 of the bail 28, the bail 28 is further prevented from being lifted, thereby further locking the pair of movable jaws 26 closed.

Figure 7:
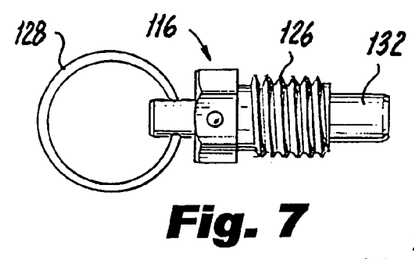
FIG. 7 is an enlarged diagrammatic side elevational view of the area generally enclosed by the dotted curve identified by ARROW 7 in 5 of the primary lock assembly of the self-locking scissor coupling of the present invention in its locked position.
Figure 8:
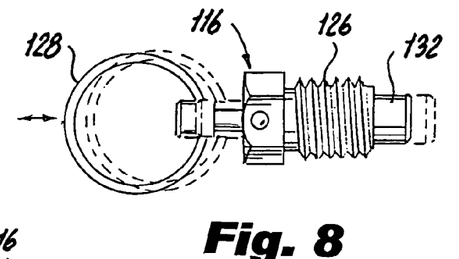
FIG. 8 is a diagrammatic side elevational view of the primary lock assembly of the self-locking scissor coupling of the present invention in its released position.
Figure 9:
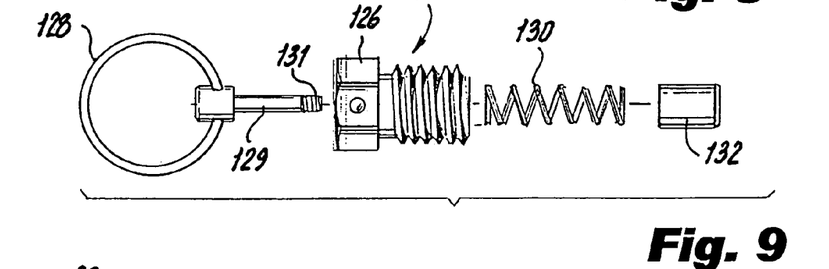
FIG. 9 is an exploded diagrammatic side elevational view of the primary lock assembly of the self-locking scissor coupling of the present invention shown in FIGS. 7 and 8.

The specific configuration of the primary locking assembly 116 can best be seen in FIGS. 7-9, which are, respectively, an enlarged diagrammatic side elevational view of the area generally enclosed by the dotted curve identified by ARROW 7 in 5 of the primary lock assembly of the self-locking scissor coupling of the present invention in its locked position, a diagrammatic side elevational view of the primary lock assembly of the self-locking scissor coupling of the present invention in its released position, and, an exploded diagrammatic side elevational view of the primary lock assembly of the self-locking scissor coupling of the present invention shown in FIGS. 7 and 8, and as such, will be discussed with reference thereto.

The primary lock assembly 116 comprises a bushing 126, a pull ring 128 having a stem 129 with a free end 131, a spring 130, and a plunger 132.

The bushing 126 of the primary lock assembly 116 is threaded into the primary lock-mounting through bore 106 in the one side of the pair of sides 95 of the bail 28.

The stem 129 of the pull ring 128 of the primary lock assembly 116 extends axially movably in the bushing 126 of the primary lock assembly 116.

The spring 130 of the primary lock assembly 116 receives the stem 129 of the pull ring 128 of the primary lock assembly 116 and is captured in the bushing 126 of the primary lock assembly 116.

The plunger 132 of the primary lock assembly 116 is affixed to the free end 131 of the stem 129 of the pull ring 128 of the primary lock assembly 116, is biased out of the bushing 126 of the primary lock assembly 116 by the spring 130 of the primary lock assembly 116, and selectively engages in the primary lock-mounting through bore 48 in the one side of the pair of sides 36 of the body 24, and when the plunger 132 of the primary lock assembly 116 is released from the primary lock-mounting through bore 48 in the one side of the pair of sides 36 of the body 24 by pulling the pull ring 128 of the primary lock assembly 116, the bail 28 is allowed to be lifted, thereby unlocking the pair of movable jaws 26 and allowing them to open by biasing of the biasing spring 86 of the pair of movable jaws 26.

Figures 10, 11, 12:
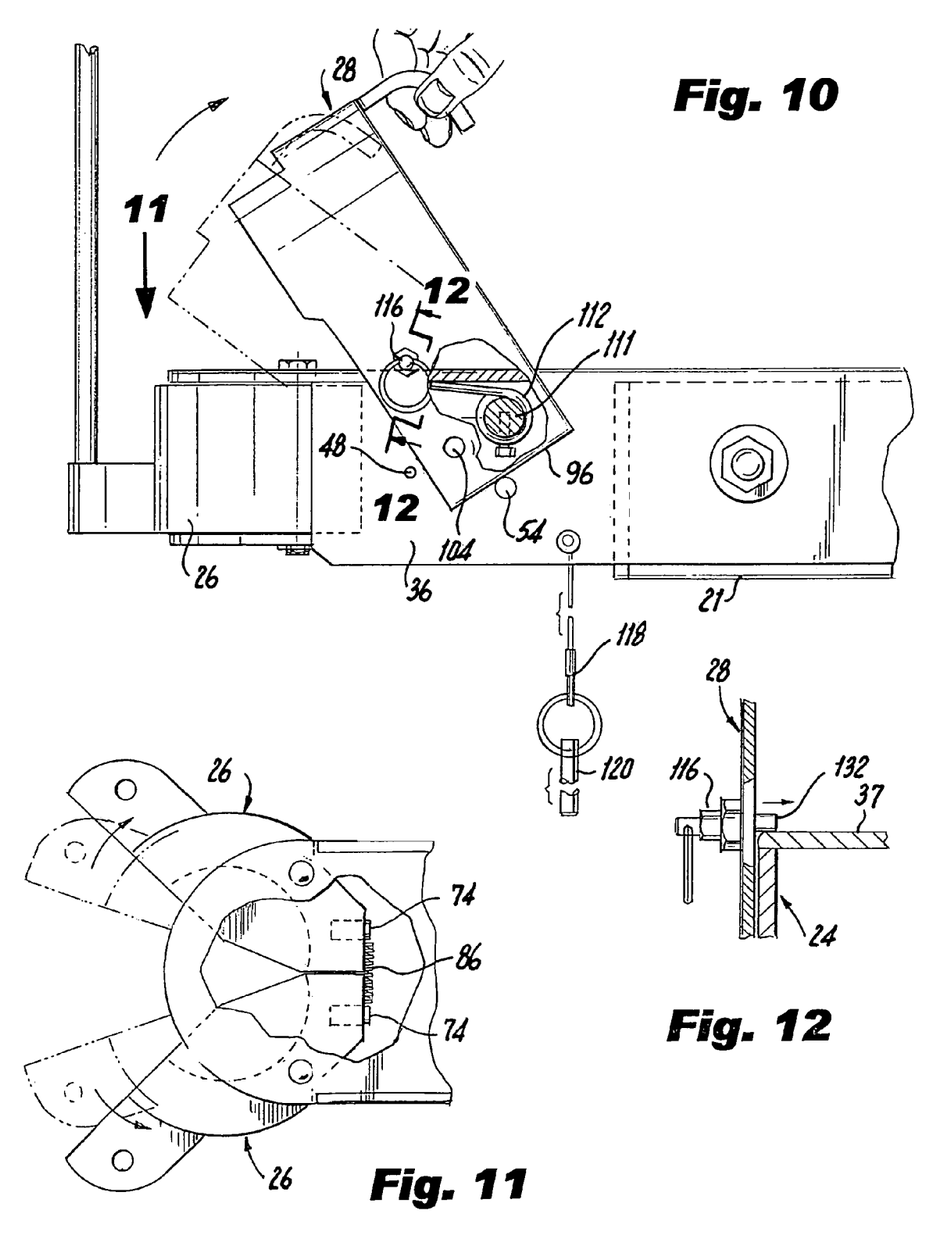
FIG. 10 is a diagrammatic side elevational view of the self-locking scissor coupler of the present invention with the primary lock assembly and the bail released and the pair of movable jaws opened.
FIG. 11 is a diagrammatic top plan view taken generally in the direction of ARROW 11 in FIG. 10.
FIG. 12 is a diagrammatic cross sectional view taken along LINE 12-12 in FIG. 10.
Figures 13, 14:
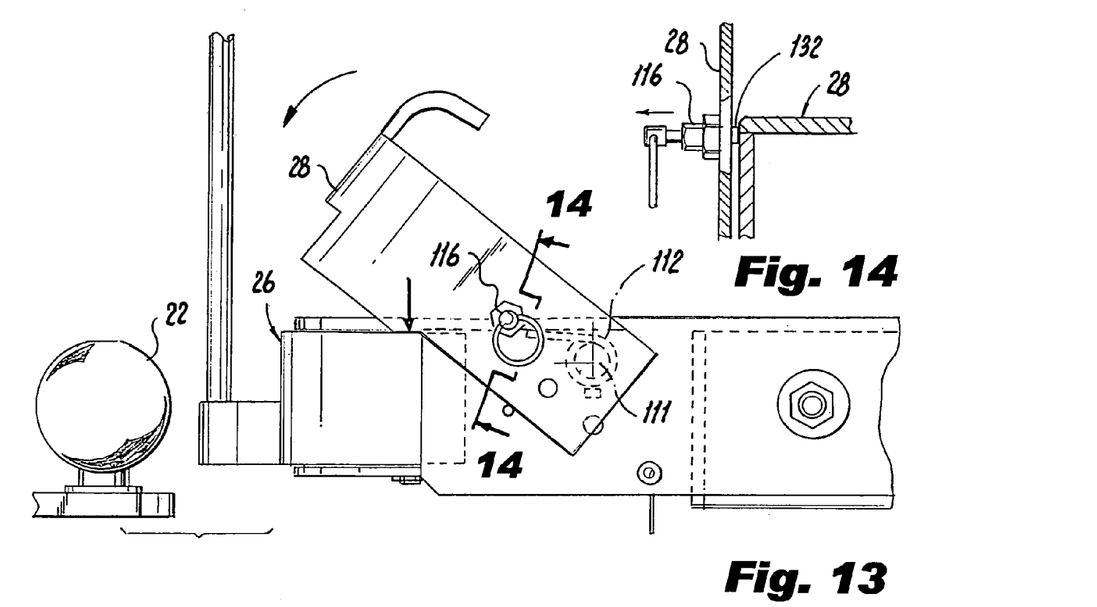
FIG. 13 is a diagrammatic side elevational view of the self-locking scissor coupler of the present invention with the bail beginning to engage the pair of movable jaws.
FIG. 14 is a diagrammatic cross sectional view taken along LINE 14-14 in FIG. 13.
Figure 15:
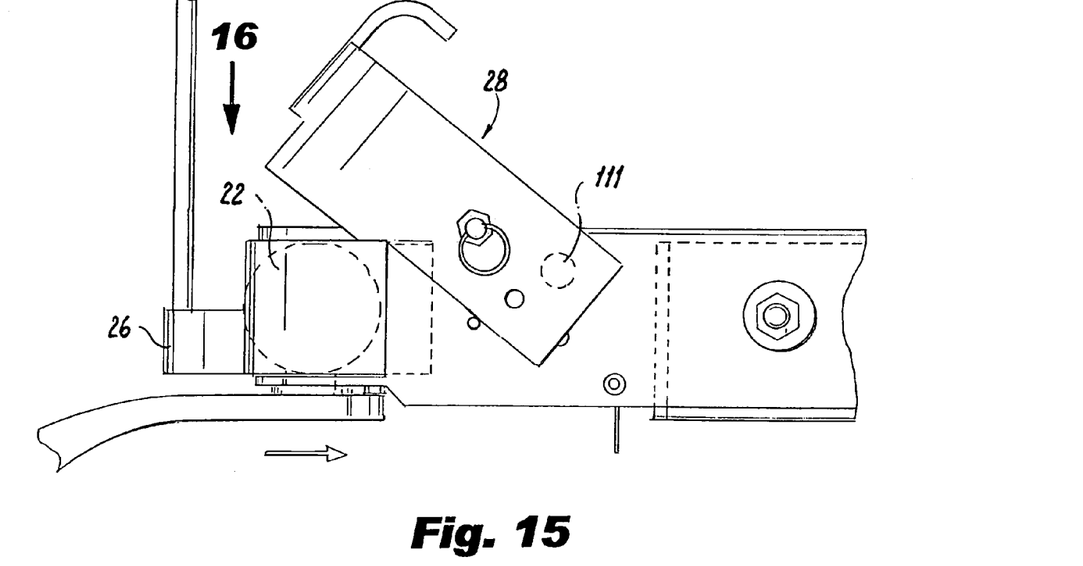
FIG. 15 is a diagrammatic side elevational view of the self-locking scissor coupler of the present invention with the trailer hitch ball beginning to engage the pair of movable jaws.
Figure 16:
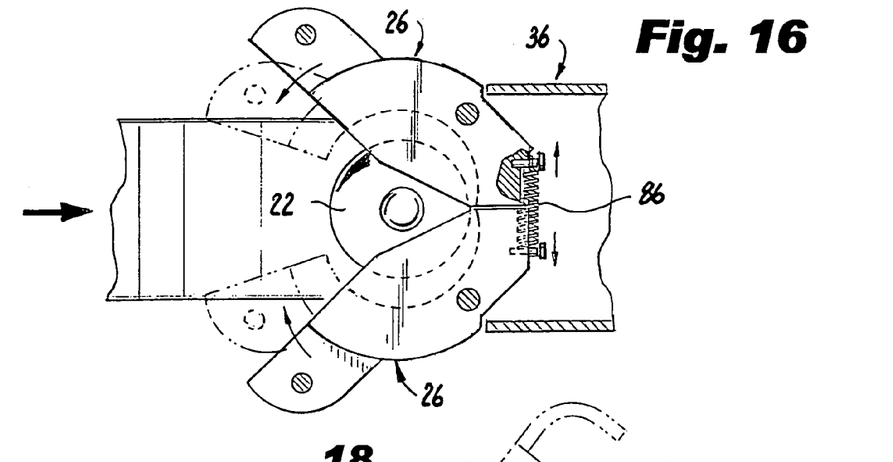
FIG. 16 is a diagrammatic top plan view taken generally in the direction of ARROW 16 in FIG. 15.
Figures 17, 18:
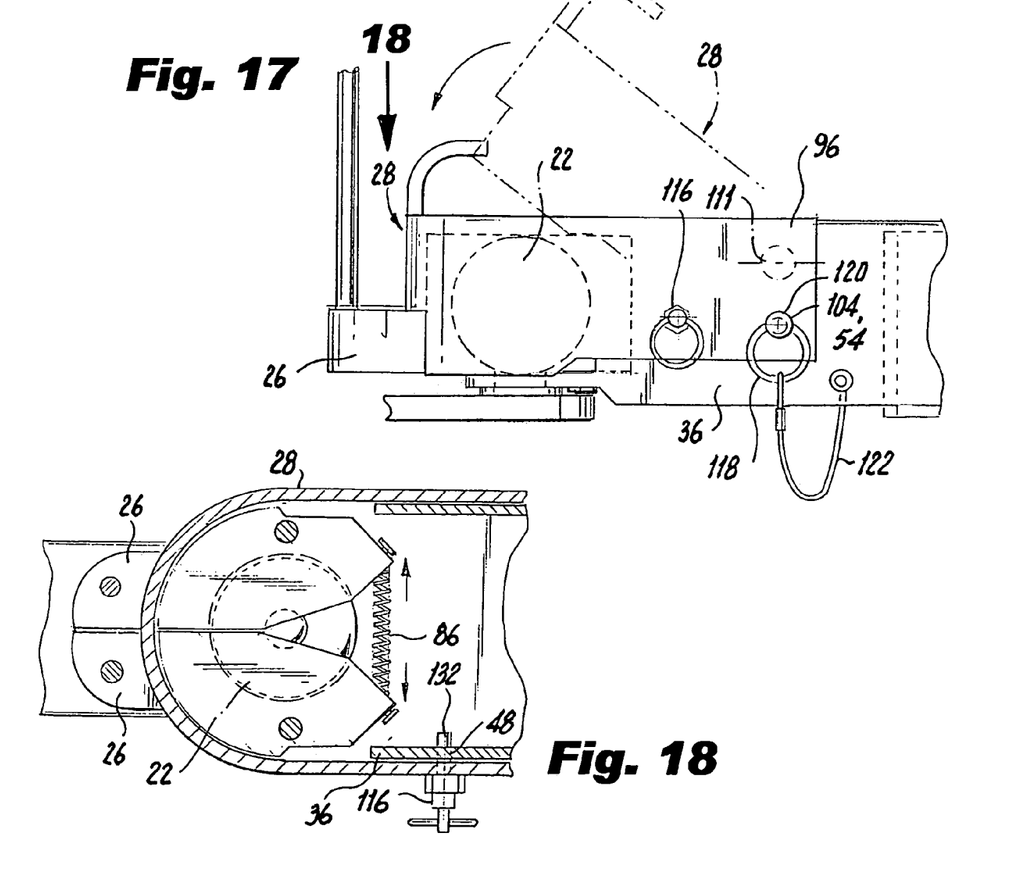
FIG. 17 is a diagrammatic side elevational view of the self-locking scissor coupler of the present invention with the trailer hitch ball releasing the pair of movable jaws and the bail locking the pair of movable jaws closed.
FIG. 18 is a diagrammatic top plan view taken generally in the direction of ARROW 18 in FIG. 17.

The method of using the self-locking scissor coupler 20 can best be seen in FIGS. 10-18, which are, respectively, a diagrammatic side elevational view of the self-locking scissor coupler of the present invention with the primary lock assembly and the bail released and the pair of movable jaws opened, a diagrammatic top plan view taken generally in the direction of ARROW 11 in FIG. 10, a diagrammatic cross sectional view taken along LINE 12-12 in FIG. 10, a diagrammatic side elevational view of the self-locking scissor coupler of the present invention with the bail beginning to engage the pair of movable jaws, a diagrammatic cross sectional view taken along LINE 14-14 in FIG. 13, a diagrammatic side elevational view of the self-locking scissor coupler of the present invention with the trailer hitch ball beginning to engage the pair of movable jaws, a diagrammatic top plan view taken generally in the direction of ARROW 16 in FIG. 15, a diagrammatic side elevational view of the self-locking scissor coupler of the present invention with the trailer hitch ball releasing the pair of movable jaws and the bail locking the pair of movable jaws closed, and, a diagrammatic top plan view taken generally in the direction of ARROW 18 in FIG. 17, and as such, will be discussed with reference thereto.

STEP 1: As shown in FIGS. 10-12, remove the pin 120 of the secondary lock assembly 118 from the secondary lock-mounting through bore 104 in each free end of the pair of free ends 96 of the bail 28 and from the secondary lock-mounting through bore 54 in each side of the pair of sides 36 of the body 24.

STEP 2: Release the primary lock assembly 116 from the primary lock-mounting through bore 48 in the one side of the pair of sides 36 of the body 24, thereby freeing the bail 28.

STEP 3: Lift the bail 28 until the plunger 132 of the primary lock assembly 116 extends out onto the top 37 of the body 24, thereby releasing, and allowing opening of, the pair of movable jaws 26 by biasing of the biasing spring 86 of the pair of movable jaws 26.

STEP 4: As shown in FIGS. 13 and 14, cause the plunger 132 of the primary lock assembly 116 to retract by pulling on the pull ring 128 of the primary lock assembly 116, thereby causing the bail 28 to fall onto the pair of movable jaws 26.

Figure 4:
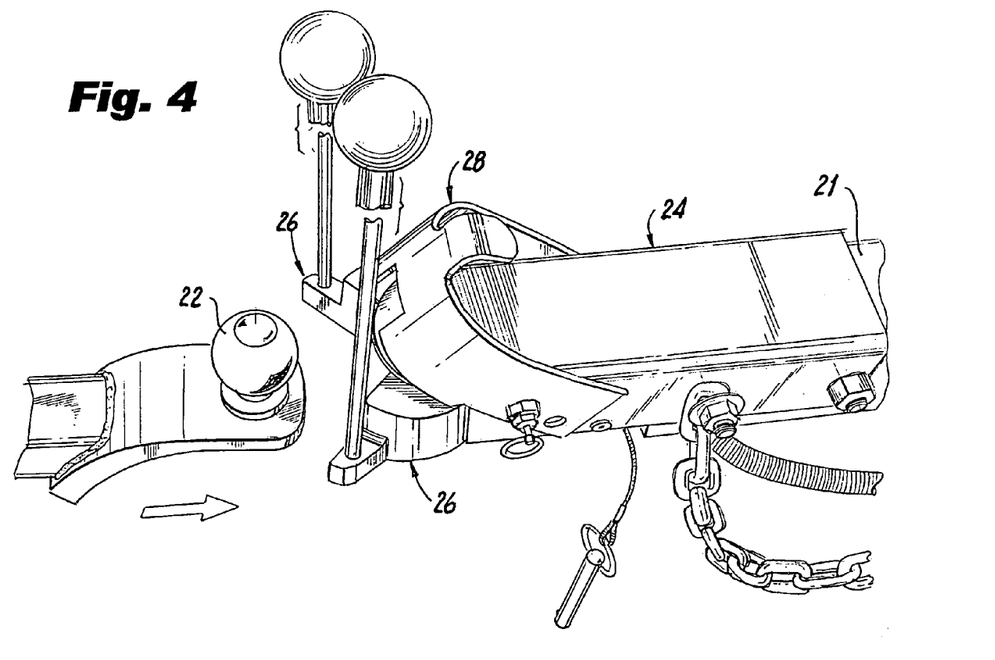
FIG. 4 is an enlarged diagrammatic perspective view of the area generally enclosed by the dotted curve identified by ARROW 4 in FIG. 1.
Figures 5, 6:
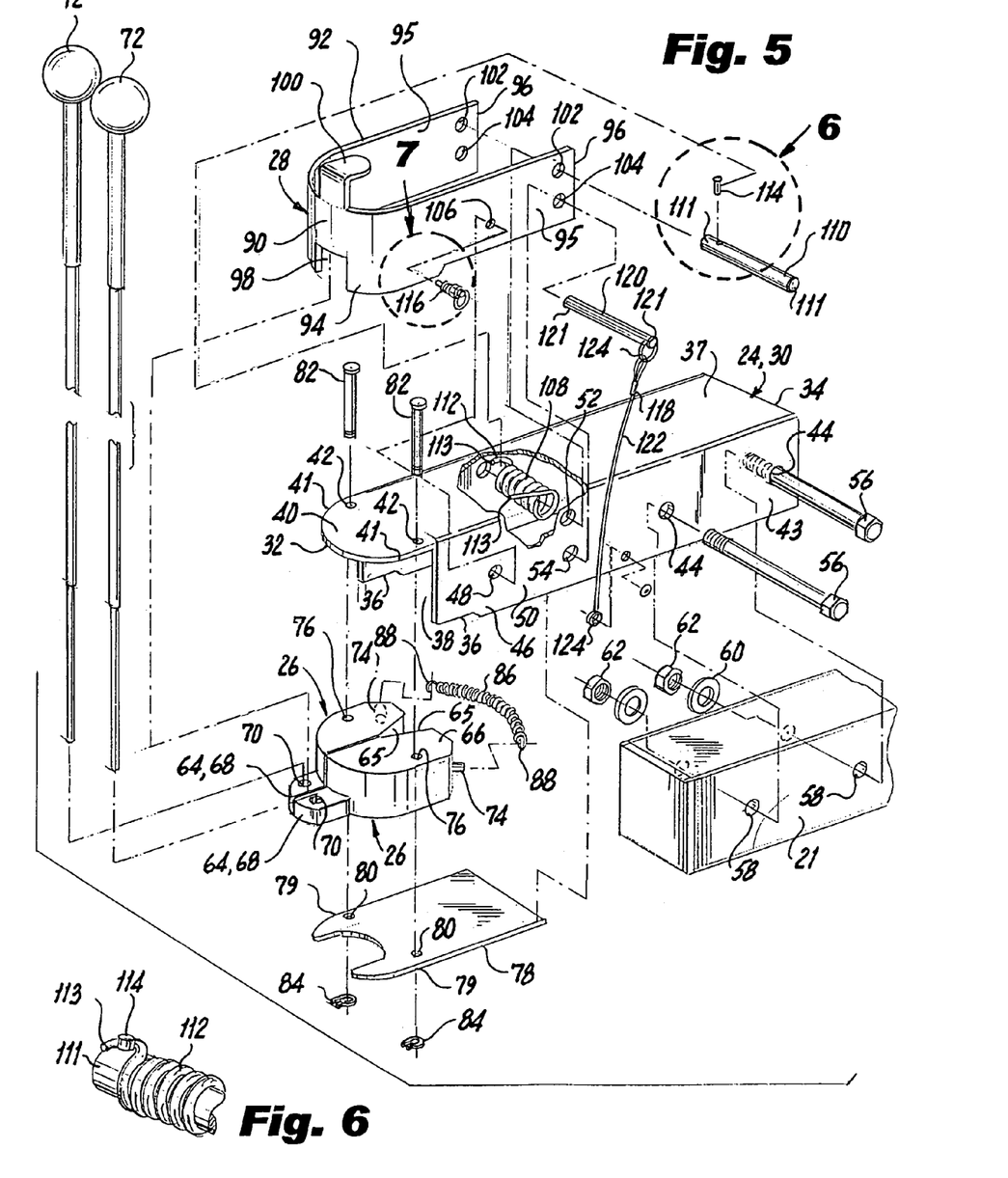
FIG. 5 is an exploded diagrammatic perspective view of the self-locking scissor coupler of the present invention shown in FIGS. 1-4.
FIG. 6 is an enlarged diagrammatic perspective view of the area generally enclosed by the dotted curve identified by ARROW 6 in FIG. 5 of the pivot pin assembly of the self-locking scissor coupler of the present invention.

STEP 5 As shown in FIGS. 1, 3, and 4 sight and observe the guide poles 72 behind the vehicle and align the trailer hitch ball 22 accordingly at the rear of the vehicle with the pair of movable jaws 26.

STEP 6: As shown in FIGS. 15 and 16, cause the trailer hitch ball 22 to enter between, and push against, the pair of movable jaws 26 against biasing of the biasing spring 86 of the pair of movable jaws 26.

STEP 7: As shown in FIGS. 17 and 18, cause the pair of movable jaws 26 to close against biasing of the biasing spring 86 of the pair of movable jaws 26 by pushing thereagainst by the trailer hitch ball 22, thereby causing the bail 28 to drop and capture the pair of movable jaws 26 with the trailer hitch ball 22 therebetween, and, the plunger 132 of the primary lock assembly 116 to enter the primary lock-mounting through bore 48 in the one side of the pair of sides 36 of the body 24, thereby locking the bail 28 around the pair of movable jaws 26 with the trailer hitch ball 22 therebetween.

STEP 8: Replace the pin 120 of the secondary lock assembly 118 in the secondary lock-mounting through bore 104 in each free end of the pair of free ends 96 of the bail 28 and in the secondary lock-mounting through bore 54 in each side of the pair of sides 36 of the body 24, thereby further locking the bail 28 around the pair of movable jaws 26 with the trailer hitch ball 22 therebetween.

It will be understood that each of the elements described above, or two or more together, may also find a useful application in other types of constructions differing from the types described above.

While the invention has been illustrated and described as embodied in a self-locking scissor coupler for attaching a trailer to a trailer hitch ball, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A self-locking scissor coupler for attaching a trailer to a trailer hitch ball, comprising:

a) a body;

b) a pair of movable jaws; and c) a bail;

wherein said body is for attaching to the trailer;

wherein said pair of movable jaws are pivotally mounted to said body;

wherein said pair of movable jaws are normally biased open;

wherein said ball bail is pivotally mounted to said body; and wherein said bail is normally biased down so as to allow said movable jaws to be normally biased open when said bail is lifted up and disengaged from said pair of movable jaws, and when said pair of movable jaws are engaged by the trailer hitch ball, said pair of jaws close causing said bail to drop, engage said pair of movable jaws, and maintain said pair of jaws closed, thereby self-lockingly capturing the trailer ball in said pair of movable jaws;

wherein said body is an inverted channel;

wherein said body has a forward end;

wherein said body has a back end;

wherein said body has a pair of sides;

wherein said body has a top;

wherein said body has an open bottom; and wherein said open bottom of said body allows for capturing of the trailer in said body;

wherein said top of body, at said forward end of said body, extends past said pair of sides of said body to form a jaw mounting platform;

wherein said jaw-mounting platform of said body, at sides thereof, has a pair of jaw-mounting through bores;

wherein said pair of jaw-mounting through bores in said jaw-mounting platform of said body are laterally spaced-apart from each other; and wherein said pair of jaw-mounting through bores in said jaw-mounting platform of said body extend vertically therethrough;

wherein one side of the said pairs of sides of said body, at the front portion thereof, has a primary lock-mounting through bore, wherein said primary lock-mounting through bore in said one side of said pair of sides of said body extends horizontally therethrough;

wherein each side of said pair of sides of said body, at an intermediate portion thereof, has a pivot pin-mounting through bore, wherein said pivot pin-mounting through bore in each side of sides of said body extends horizontally therethrough; and wherein said pivot pin-mounting through bore in each side of said pair of sides of said body aligns with said pivot pin-mounting through bore in the other side of said pair of sides of said body;

wherein a side of said pair of sides of said body, at said front portion thereof, has a secondary lock-mounting through bore, wherein said secondary lock-mounting through bore in each side of said pair of sides of said body extends horizontally therethrough;

wherein said secondary lock-mounting through bore in each side of said pair of sides of said body is below said pivot pin-mounting through bore in each side of said body; and wherein said secondary lock-mounting through bore in each side of said pair of sides of said body aligns with said secondary lock-mounting through bore in the other side of said pairs of sides of said body.

2. The coupler of claim 1, wherein each jaw of said pair of movable jaws has a forward end;

wherein each jaw of said pair of movable jaws has an inner side; and wherein each jaw of said pair of movable jaws has back end.

3. The coupler of claim 2, wherein said forward end of each jaw of said pair of movable jaws extends forwardly to form a guide-mounting platform.

4. The coupler of claim 3, wherein said guide-mounting platform of each jaw of said pair of movable jaws has a guide-mounting bore, wherein said guide mounting bore in said guide-mounting platform of each jaw of said pair of movable jaws extends vertically therein; and wherein said guide mounting bore in said guide-mounting platform of each jaw of said pair of movable jaws receives a guide pole.

5. The coupler of claim 4, wherein said back end of each jaw of said pair of movable jaws has a stud, wherein said stud of said back end of each jaw of said pair of movable jaws extends rearwardly therefrom.

6. The coupler of claim 5, wherein each jaw of said pair of movable jaws has a jaw-mounting through bore, wherein said jaw-mounting through bore in each jaw of said pair of movable jaws extends vertically therethrough.

7. The coupler of claim 6, wherein said pair of movable jaws has a jaw-mounting plate, wherein said jaw-mounting plate of said pair of movable jaws, at sides thereof, has a pair of jaw-mounting through bores.

8. The coupler of claim 7, wherein said pair of jaw-mounting through bores in said jaw-mounting plate of said pair of movable jaws extend vertically therethrough;

wherein said pair of jaw-mounting through bores in said jaw-mounting plate of said pair of movable jaws align with said jaw-mounting through bore in each jaw of said pair of movable jaws, respectively; and wherein said pair of jaw-mounting through bores in said jaw-mounting plate of said pair of movable jaws align with said pair of jaw-mounting through bores in said jaw-mounting platform of said body, respectively.

9. The coupler of claim 8, wherein said pair of movable jaws has a pair of jaw-mounting pivot pins, wherein said pair of jaw-mounting pivot pins of said pair of movable jaws enter said pair of jaw-mounting through bores in said jaw-mounting platform of said body, respectively, through said jaw-mounting through bore in each jaw of said pair of movable jaws, respectively, through and out said pair of jaw-mounting through bores in said jaw-mounting plate of said pair of movable jaws, respectively, and engage a pair of clips, respectively.

10. The coupler of claim 9, wherein said pair of movable jaws has a biasing spring; and wherein said biasing spring of said pair of movable jaws has a pair of ends, wherein each end of said pair of ends of said biasing spring of said pair of movable jaws engage said stud of said back end of a respective jaw of said pair of movable jaws, and in so doing, biases said pair of movable jaws open.

11. The coupler of claim 10, wherein said inner side of each jaw of said pair of movable jaws is relieved so as to provide room for said pair of movable jaws to open under biasing of said biasing spring of said pair of movable jaws.

12. The coupler of claim 11, wherein said bail is U-shaped, wherein said bail has a forward end;

wherein said bail has a top edge;

wherein said bail has a bottom edge;

wherein said bail has a pair of sides; and wherein said bail has a pair of free ends.

13. The coupler of claim 12, wherein said bottom edge of said bail, at said forward end thereof, has a recess, wherein said recess in said bottom edge of said bail extends vertically therein, wherein said top edge of said bail, at said forward end thereof, has a tongue, wherein said tongue of said top edge of said bail extends upwardly and then rearwardly therefrom.

14. The coupler of claim 13, wherein each free end of said pair of free ends of said bail has a pivot pin-mounting through bore.

15. The coupler of claim 14, wherein said pivot pin-mounting through bore in each free end of said pair of free ends of said bail extends horizontally therethrough;

wherein said pivot pin-mounting through bore in each free end of said pair of free ends of said bail aligns with said pivot pin-mounting through bore in the other free end of said pair of free ends of said bail; and wherein said pivot pin-mounting through bore in each free end of said pair of free ends of said bail aligns with said pivot pin-mounting through bore in each side of said pair of sides of said body.

16. The coupler of claim 15, wherein each free end of said pair of free ends of said bail has secondary lock-mounting through bore, wherein said secondary lock-mounting through bore in each free end of said pair of free ends of said bail extends horizontally therethrough;

wherein said secondary lock-mounting through bore in each free end of said pair of free ends of said bail is below said pivot pin-mounting through bore in each free end of said pair of free ends of said bail;

wherein said secondary lock-mounting through bore in each free end of said pair of free ends of said bail aligns with said secondary lock-mounting through bore in the other free end of said pair of free ends of said bail; and wherein said secondary lock-mounting through bore in each free end of said pair of free ends of said bail aligns with said secondary lock-mounting through bore in each side of said pair of sides of said body.

17. The coupler of claim 16, wherein one side of said pair of sides of said bail has a primary lock-mounting through bore, wherein said primary lock-mounting through bore in said one side of said pair of sides of said bail extends horizontally therethrough; and wherein said primary lock-mounting through bore in said one side of said pair of sides of said bail aligns with said primary lock-mounting through bore in said one side of said pair of sides of said body.

18. The coupler of claim 17, further comprising a pivot pin assembly, wherein said pivot pin assembly comprises a pivot pin;

wherein said pivot pin of said pivot pin assembly has a pair of ends;

wherein said pivot pin assembly comprises a biasing spring; and wherein said biasing spring of said pivot pin assembly has a pair of ends.

19. The coupler of claim 18, wherein said biasing spring of said pivot pin assembly receives said pivot pin of said pivot pin assembly.

20. The coupler of claim 19, wherein said pivot pin assembly is nestled in said body;
   wherein said pair of ends of said pivot pin of said pivot pin assembly extend in said pivot pin-mounting through bore in each side of said pair of sides of said body, respectively, and said pivot pin-mounting through bore in each free end of said pair of free ends of said bail, respectively;
   wherein one end of said biasing spring of said biasing assembly engages a stud in one end of said pivot pin of said pivot pin assembly; and
   wherein the other end of said biasing spring of said biasing assembly stops against said top of said body so as to bias said bail downwardly.

21. The coupler of claim 20, further comprising a primary lock assembly, wherein said primary lock assembly is affixed in said primary lock-mounting through bore in said one side of said pair of sides of said bail; and
   wherein said primary lock assembly selectively engages in said primary lock-mounting through bore in one side of said pair of sides of said body, and when said primary lock assembly engages in said primary lock-mounting through bore in said one side of said pair of sides of said body, said bail is prevented from being lifted, thereby locking said pair of movable jaws closed with the trailer hitch ball therebetween.

22. The coupler of claim 21, further comprising a secondary lock assembly.

23. The coupler of claim 22, wherein said secondary lock assembly comprises a pin;
   wherein said pin of said secondary lock assembly has a pair of ends;
   wherein said secondary lock assembly comprises a lanyard; and
   wherein said lanyard of said secondary lock assembly has a pair of ends.

24. The coupler of claim 23, wherein one end of said pair of ends of said lanyard of said secondary locking assembly is affixed to one side of said pair of sides of said body;
   wherein the other end of said pair of ends of said lanyard of said secondary lock assembly is affixed to one end of said pair of ends of said pin of said secondary lock assembly; and
   wherein said pin of said secondary lock assembly selectively enters said secondary lock-mounting through bore in one free end of said pair of free ends of said bail, through said secondary lock-mounting through bore in each side of said pair of sides of said body, and through and out said secondary lock-mounting through bore in the other free end of said pair of free ends of said bail, and when said pin of said secondary lock assembly enters said secondary lock-mounting through bore in said one free end of said pair of free ends of said bail, through said secondary lock-mounting through bore in each side of said pair of sides of said body, and through and out said secondary lock-mounting through bore in the other free end of said pair of free ends of said bail, said bail is further prevented from being lifted thereby further locking said pair of movable jaws closed with the trailer hitch ball therebetween.

25. The coupler of claim 24, wherein said primary lock assembly comprises a bushing;
   wherein said primary lock assembly comprises a pull ring;
   wherein said pull ring of said primary lock assembly has a stem;
   wherein said stem of said pull ring of said primary lock assembly has a free end;
   wherein said primary lock assembly has a spring; and
   wherein said primary lock assembly has a plunger.

26. The coupler of claim 25, wherein said bushing of said primary lock assembly is threaded into said primary lock-mounting through bore in said one side of said pair of sides of said bail, wherein said stem of said pull ring of said primary lock assembly extends axially movably in said bushing of said primary lock assembly.

27. The coupler of claim 26, wherein said spring of said primary lock assembly receives said stem of said pull ring of said primary lock assembly; and
   wherein said spring of said primary lock assembly is captured in said bushing of said primary lock assembly.

28. The coupler of claim 27, wherein said plunger of said primary lock assembly is affixed to said free end of said stem of said pull ring of said primary lock assembly;
   wherein said plunger of said primary lock assembly is biased out of said bushing of said primary lock assembly by said spring of said primary lock assembly; and
   wherein said plunger of said primary lock assembly selectively engages in said primary lock-mounting through bore in said one side of said pair of sides of said body, and when said plunger of said primary lock assembly is released from said primary lock-mounting through bore in said one side of said pair of sides of said body by pulling said pull ring of said primary lock assembly, said bail is allowed to be lifted, thereby unlocking said pair of movable jaws and allowing them to open by biasing of said biasing spring of said pair of movable jaws.

29. A method of using a self-locking scissor coupler to attach a trailer to a trailer hitch ball, comprising the steps of:
   a) removing a pin of a secondary lock assembly of the self-locking scissor coupler from a secondary lock-mounting through bore in each free end of a pair of free ends of a bail of the self-locking scissor coupler and from a secondary lock-mounting through bore in each side of a pair of sides of a body of the self-locking scissor coupler;
   b) releasing a primary lock assembly of the self-locking scissor coupler from a primary lock-mounting through bore in one side of the pair of sides of the body, thereby freeing the bail;
   c) lifting the bail until a plunger of the primary lock assembly extends out onto a top of the body, thereby releasing, and allowing opening of, a pair of movable jaws of the self-locking scissor coupler by biasing of a biasing spring of the pair of movable jaws;
   d) causing the plunger of the primary lock assembly to retract by pulling on a pull ring of the primary lock assembly, thereby causing the bail to fall onto the pair of movable jaws;
   e) causing the trailer hitch ball to enter between, and push against, the pair of movable jaws against biasing of the biasing spring of the pair of movable jaws;
   f) causing the pair of movable jaws to close against biasing of the biasing spring of the pair of movable jaws by pushing thereagainst by the trailer hitch ball, thereby causing the bail to drop and capture the pair of movable jaws with the trailer hitch ball therebetween, and, the plunger of the primary lock assembly to enter the primary lock-mounting through bore in the one side of the pair of sides of the body, thereby locking the bail around the pair of movable jaws with the trailer hitch ball therebetween; and g) replacing the pin of the secondary lock assembly in the secondary lock-mounting through bore in each free end of the pair of free ends of the bail and in the secondary lock-mounting through bore in each side of the pair of sides of the body, thereby further locking the bail around the pair of movable jaws with the trailer hitch ball therebetween;

h) wherein said secondary lock-mounting through bore in each side of said pair of said body is below a pivot pin-mounting through bore in each side of said pairs of said body; and wherein said secondary lock-mounting through bore in each side of said pair of sides of said body aligns with the said secondary lock-mounting through bore in the other side of said pair of sides of said body.

* * * * *